(12) United States Patent
Oetting et al.

(10) Patent No.: US 11,133,993 B2
(45) Date of Patent: Sep. 28, 2021

(54) AUGMENTED/MIXED REALITY VIRTUAL VENUE PIPELINE OPTIMIZATION

(71) Applicant: AT&T Intellectual Property I, L.P., Atlanta, GA (US)

(72) Inventors: John Oetting, Zionsville, PA (US); Claude Noshpitz, Santa Monica, CA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 32 days.

(21) Appl. No.: 16/289,266

(22) Filed: Feb. 28, 2019

(65) Prior Publication Data

US 2020/0280496 A1    Sep. 3, 2020

(51) Int. Cl.
    *H04L 12/24*    (2006.01)
    *G06T 11/00*    (2006.01)
    *H04L 29/06*    (2006.01)

(52) U.S. Cl.
    CPC ............ *H04L 41/509* (2013.01); *G06T 11/00* (2013.01); *H04L 63/107* (2013.01); *G06T 2210/56* (2013.01)

(58) Field of Classification Search
    CPC ..... H04L 41/509; H04L 63/107; G06T 11/00; G06T 2210/56
    USPC ...................................................... 709/226
    See application file for complete search history.

(56) References Cited

U.S. PATENT DOCUMENTS

| 9,059,942 | B2 | 6/2015 | Boldyrev et al. | |
|---|---|---|---|---|
| 9,690,099 | B2 | 6/2017 | Bar-Zeev et al. | |
| 9,721,386 | B1* | 8/2017 | Worley, III | G06T 19/006 |
| 2015/0346722 | A1* | 12/2015 | Herz | G05D 1/0027 |
| | | | | 701/2 |
| 2015/0350378 | A1* | 12/2015 | Hertel | G06F 16/29 |
| | | | | 709/203 |
| 2016/0353118 | A1* | 12/2016 | Zhang | H04N 19/44 |
| 2017/0078447 | A1 | 3/2017 | Hancock et al. | |
| 2017/0132253 | A1* | 5/2017 | McKinnon | G06F 16/9535 |
| 2017/0193700 | A1* | 7/2017 | Jung | G06T 17/20 |
| 2017/0243403 | A1* | 8/2017 | Daniels | G06T 19/20 |
| 2017/0278304 | A1* | 9/2017 | Hildreth | G02B 27/0172 |
| 2017/0323472 | A1* | 11/2017 | Barnes | G06K 9/3208 |
| 2018/0061138 | A1* | 3/2018 | Neeter | H04S 7/303 |

(Continued)

FOREIGN PATENT DOCUMENTS

| CN | 108322504 A | 7/2018 |
|---|---|---|
| KR | 20110136026 A | 12/2011 |

(Continued)

*Primary Examiner* — Tauqir Hussain
(74) *Attorney, Agent, or Firm* — Amin, Turocy & Watson LLP

(57) ABSTRACT

Augmented/mixed reality virtual venue pipeline optimization is provided. A method can include acquiring, by a device comprising a processor, information relating to a group of augmented reality applications operating in an area; designating, by the device, an augmented reality application of the group of augmented reality applications as a priority application based on the information relating to the group of augmented reality applications; and granting, by the device, prioritized access to edge network resources in a sub-area comprising at least a portion of the area to the priority application relative to at least one non-priority application of the group of augmented reality applications.

20 Claims, 11 Drawing Sheets

(56) References Cited

U.S. PATENT DOCUMENTS

| | | |
|---|---|---|
| 2018/0063205 A1 | 3/2018 | French |
| 2018/0160160 A1 | 6/2018 | Swaminathan et al. |
| 2018/0190017 A1* | 7/2018 | Mendez .................. G06T 17/00 |
| 2018/0336728 A1* | 11/2018 | Edwards ................. G06F 3/011 |
| 2019/0043259 A1* | 2/2019 | Wang ..................... H04N 13/25 |
| 2019/0156558 A1* | 5/2019 | Neeter ................. G02B 27/017 |
| 2019/0388781 A1* | 12/2019 | Taylor ................. A63F 13/5375 |
| 2020/0196194 A1* | 6/2020 | Kozat ................. H04L 41/0806 |

FOREIGN PATENT DOCUMENTS

| | | |
|---|---|---|
| WO | 2012154620 A2 | 11/2012 |
| WO | 2015062164 A1 | 5/2015 |

\* cited by examiner

AUGMENTED/MIXED REALITY VIRTUAL VENUE PIPELINE OPTIMIZATION

TECHNICAL FIELD

The present disclosure relates to wireless communication systems, and, in particular, to techniques for managing virtual reality, augmented reality, and/or mixed reality applications over a wireless communication system.

BACKGROUND

Advancements in computing and network technology have resulted in the proliferation of augmented reality (AR) and mixed reality (MR) applications, which can render virtual elements onto real-world scenes to create rich, immersive experiences. AR and MR applications are presently employed in a wide variety of fields such as entertainment, education, and public works, among others. Such applications can communicate with respective elements of a wireless communication network to provide experiences to users through devices such as smartphones or headsets. Accordingly, it is desirable to implement techniques to improve network resource efficiency for these and/or other applications.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

In an aspect, a method as described herein can include acquiring, by a device comprising a processor, information relating to a group of augmented reality applications operating in an area. The method can further include designating, by the device, an augmented reality application of the group of augmented reality applications as a priority application based on the information relating to the group of augmented reality applications. The method can additionally include granting, by the device, prioritized access to edge network resources in a sub-area comprising at least a portion of the area to the priority application relative to at least one non-priority application of the group of augmented reality applications.

In another aspect, a system as described herein can include a processor and a memory that stores executable instructions that, when executed by the processor, facilitate performance of operations. The operations can include acquiring information relating to a group of augmented reality applications operating in an area, designating an augmented reality application of the group of augmented reality applications as a priority application based on the information relating to the group of augmented reality applications, and granting prioritized edge network access to the priority application relative to at least one non-priority application of the group of augmented reality applications in a sub-area comprising at least a portion of the area.

In a further aspect, a machine-readable storage medium as described herein can include executable instructions that, when executed by a processor, facilitate performance of operations. The operations can include obtaining information relating to a group of augmented reality applications operating within a geographical area, selecting an augmented reality application of the group of augmented reality applications based on the information relating to the group of augmented reality applications, and granting prioritized network resource access to the selected augmented reality application relative to at least one non-selected augmented reality application of the group of augmented reality applications in a section of the geographical area.

Figure 1:
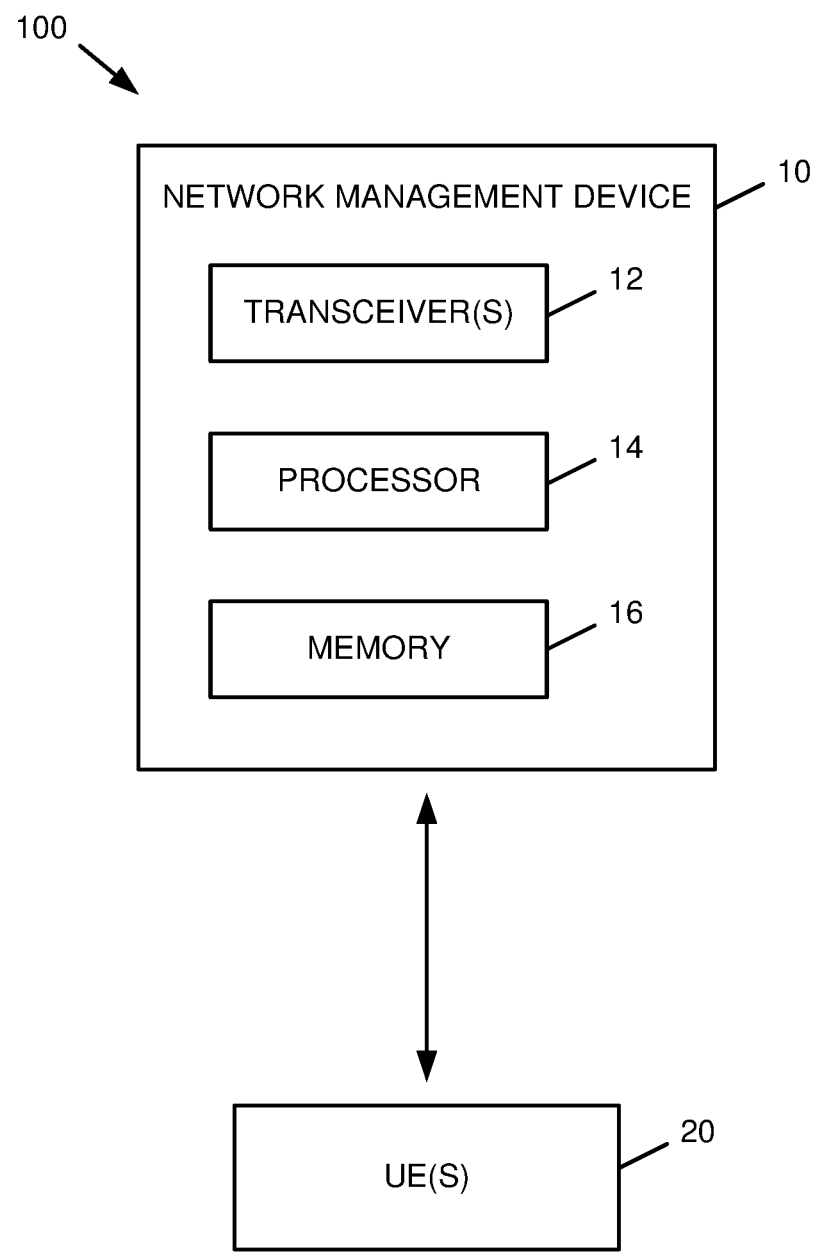
FIG. 1 is a block diagram of a system that facilitates augmented/mixed reality virtual venue pipeline optimization in accordance with various aspects described herein.

Referring first to FIG. 1, a system 100 that facilitates augmented/mixed reality virtual venue pipeline optimization is illustrated. System 100 as shown by FIG. 1 includes a network management device 10 that can communicate with one or more user equipment devices (UEs) 20. In an aspect, the network management device 10 can be a base station, an access point (AP), an Evolved Node B (eNB), and/or another device that provides communication service to the UEs 20. Also or alternatively, the network management device 10 can be implemented wholly or in part by one or more routers or relays, such as an edge router, that direct the flow of communication between one or more UEs 20 in an area and associated nearby network infrastructure. In still another example, the network management device 10 can be implemented by one or more network controllers and/or other devices that manage communication between devices of a wireless communication network. A separate controller implemented in this manner can reside on the same communication network as the UE 20 and corresponding base stations or on a different network (e.g., such that the controller can communicate with respective network devices via a separate system). Other implementations of the network management device 10 are also possible.

Collectively, the network management device 10 and the UE 20 can form at least a portion of a wireless communication system. While only one network management device 10 and one UE 20 are illustrated in FIG. 1 for simplicity of illustration, it should be appreciated that a wireless communication network can include any number of UEs and/or other devices such as the network management device 10, APs, etc.

The network management device 10 shown in system 100 can include one or more transceivers 12 that can communicate with (e.g., transmit messages to and/or receive messages from) the UE 20 and/or other devices in system 100. The transceiver 12 can include respective antennas and/or any other hardware or software components (e.g., an encoder/decoder, modulator/demodulator, etc.) that can be utilized to process signals for transmission and/or reception by the network management device 10 and/or associated network devices such as an AP.

In an aspect, the network management device 10 can further include a processor 14 and a memory 16, which can be utilized to facilitate various functions of the network management device 10. For instance, the memory 16 can include a non-transitory computer readable storage medium that contains computer executable instructions, and the processor 14 can execute instructions stored by the memory 16. For simplicity of explanation, various actions that can be performed via the processor 14 and the memory 16 of the network management device 10 are shown and described below with respect to various logical components. In an aspect, the components described herein can be implemented in hardware, software, and/or a combination of hardware and software. For instance, a logical component as described herein can be implemented via instructions stored on the memory 16 and executed by the processor 14. Other implementations of various logical components could also be used, as will be described in further detail where applicable.

In an aspect, the processor 14 and memory 16 can be utilized to acquire information relating to a group of augmented reality (AR) applications operating in an area. As used herein, the term "augmented reality application" refers to any application that renders virtual objects onto a display of a real-world area. Accordingly, the term "augmented reality application" as used herein can refer both to traditional AR applications as well as mixed reality (MR) applications that anchor virtual objects to particular real-world locations. Additionally, similar concepts to those described herein for AR applications can also be used for virtual reality (VR) applications. In a further aspect, the processor 14 and memory 16 can utilize this acquired information to manage network resource usage, e.g., edge network resource usage, associated with the AR applications in the area in various ways as will be described in further detail below.

By implementing various embodiments as described herein, various advantages can be realized that can improve the performance of a wireless communication network and/or respective devices in the network. These advantages can include, but are not limited to, the following. Network bandwidth usage efficiency in an area can be increased. Performance of AR applications and/or other applications associated with a communication network (e.g., in terms of power usage, processing cycles used, etc.) can be increased. AR applications and/or other applications can be better tailored to the specifications of the user devices on which the applications are executed. Performance of public safety, public utility, and/or other high-priority applications can be improved even in highly congested areas. Other advantages are also possible.

Figure 2:
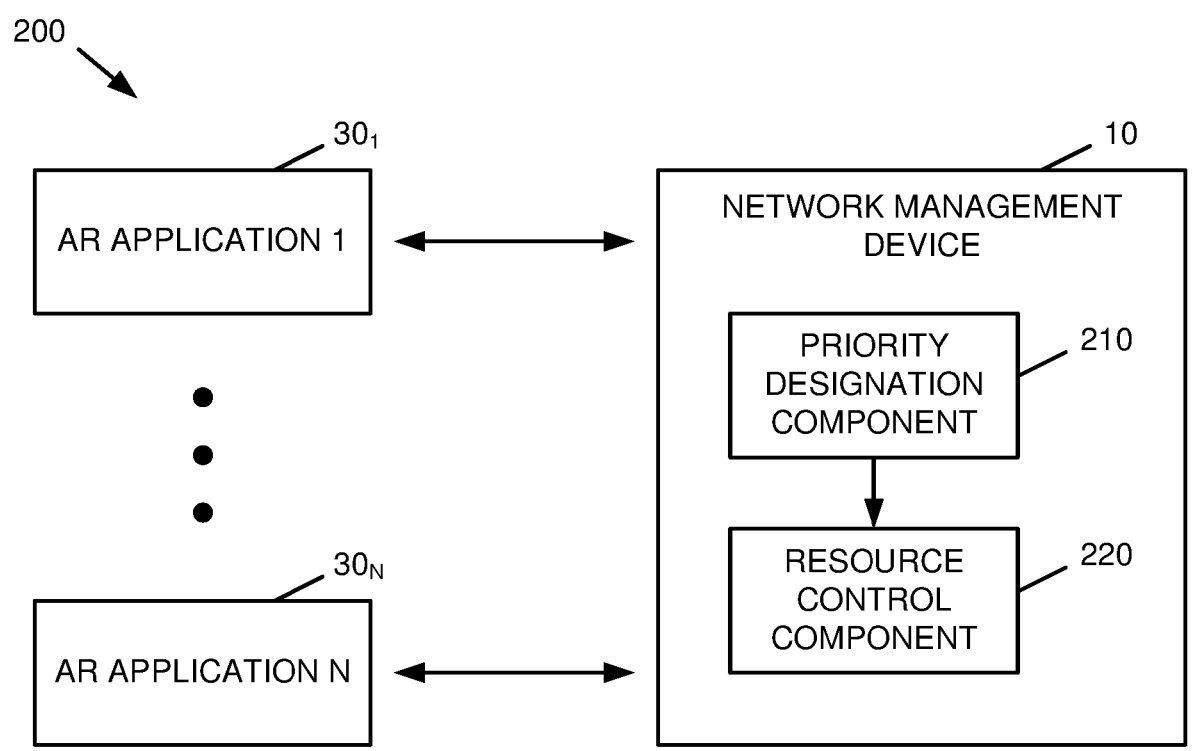
FIG. 2 is a block diagram of a system that facilitates network resource management for augmented reality applications in accordance with various aspects described herein.

With reference now to FIG. 2, a block diagram of a system 200 that facilitates network resource management for augmented reality applications in accordance with various aspects described herein is illustrated. Repetitive description of like elements employed in other embodiments described herein is omitted for sake of brevity. System 200 as shown in FIG. 2 includes a network management device 10 that can operate in a similar manner to that described above with respect to FIG. 1. As further shown in FIG. 2, the network management device 10 can communicate with one or more AR applications 30, here a group of N AR applications 30, via one or more communication networks.

In an aspect, the respective AR applications 30 can render virtual objects onto a real-world background, thereby providing a partially virtualized view, also known as a virtual venue experience (VVE), to a user of a UE 20 and/or other suitable rendering device. To facilitate a VVE, an AR application 30 can exchange data with a virtual venue platform (VVP), which can be implemented via one or more communication devices in a communication network. The timeliness and frequency of this data exchange can be variable, e.g., ranging from a one-time exchange at the launch of the VVE to regular real-time updates during the experience.

Communications between an AR application 30 and a VVP have latency associated with signal travel time and/or other factors, which can result in perceived delay associated with rendered virtual objects. This delay is commonly known as motion-to-photon latency due to its basis in the delay between motion of an object and visual perception of said motion. It is highly desirable to mitigate motion-to-photon latency (e.g., to no more than 20 ms), as high motion-to-photon latency can result in diminished user experience. To this end, a VVP can operate on the UE 20 itself and/or one or more devices of an edge network (edge cloud), which can include cell towers, local resource controllers, and/or other network devices deployed close to the area in which the AR application 30 operates for a particular UE 20. This can reduce the latency of messaging between the AR application 30 and the VVP relative to communications between an AR application 30 and a centralized network apparatus.

In an aspect, different AR applications 30 operating in the same physical environment can utilize common resources, e.g., edge cloud resources associated with the physical area. In some instances, this can result in conflicts and/or competition between the AR applications 30 for edge network resources. To this end, the network management device 10 shown in FIG. 2 can allocate resources between respective AR applications 30 in the area according to a variety of factors as described below.

In an aspect, the network management device 10 as shown in system 200 can include a priority designation component 210 that can designate an AR application 30 from among a group of AR applications 30, e.g., a group of AR applications 30 operating in a geographic area, as a priority application based on acquired information relating to the AR applications 30. The network management device 10 further includes a resource control component 220 that can grant prioritized access to resources, such as edge network resources, to the priority application in at least a portion of the geographic area associated with the group of AR applications 30 relative to at least one other AR application 30, e.g., a non-priority application of the group of AR applications 30.

Priority designations as performed by the priority designation component 210 can be static or dynamic. For instance, a first AR application 30 can be designated as a priority application by the priority designation component 210 at a first time, and a second, different AR application 30 can be designated as a priority application at a second, different time. Also or alternatively, any number of AR applications 30 can be designated as a priority application at a given time, including one AR application 30 or multiple AR applications 30. Moreover, an AR application 30 can be granted priority with regard to a subset of network resources. For instance, a first AR application 30 can be granted prioritized access to network bandwidth while a second AR application 30 can be granted prioritized access to edge network computing resources and/or other resources.

In an aspect, the resource control component 220 can facilitate modifications to various operating parameters of an AR application 30 in response to the AR application 30 being designated as a priority application. For instance, the resource control component 220 can facilitate increased registration accuracy, visual quality (e.g., in terms of image resolution, color depth, frame rate, etc.), audio quality, directional accuracy, etc., for virtual objects associated with a priority application. Other modifications can also be facilitated by the resource control component 220.

In another aspect, an AR application 30 associated with the network management device 10 can be notified of its status as a priority application or a non-priority application, e.g., by the network management device 10 itself and/or one or more devices associated with a communication network on which the AR application 30 operates. Also or alternatively, an AR application 30 can be notified of respective resource grants and/or restrictions associated with the status of the AR application as a priority or non-priority application.

Figure 3:
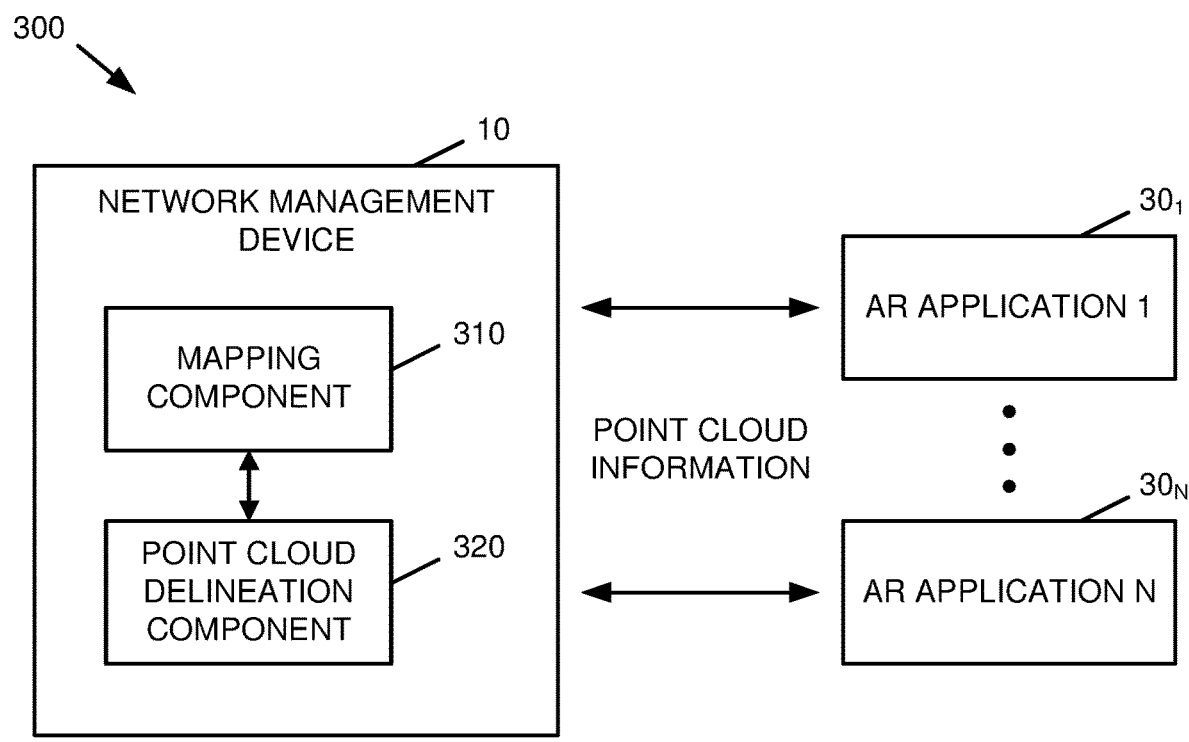
FIG. 3 is a block diagram of a system that facilitates point cloud mapping and area provisioning in accordance with various aspects described herein.

Turning now to FIG. 3, a block diagram of a system 300 that facilitates point cloud mapping and area provisioning in accordance with various aspects described herein is illustrated. Repetitive description of like elements employed in other embodiments described herein is omitted for sake of brevity. System 300 as shown in FIG. 3 includes a network management device 10, which in turn can include a mapping component 310 that maps a geographical area via a two- or three-dimensional point cloud and/or via other means. The network management device 10 further includes a point cloud delineation component 320, which can delineate and/or otherwise define a sub-area within the geographical area that is associated with a priority application, e.g., an AR application 30 as designated by the priority designation component 210 in the manner described above with respect to FIG. 2. Based on the sub-area as defined by the point cloud delineation component 320, the network management device 10 (e.g., via a resource control component 220) can grant prioritized access to edge network resources and/or other resources to a priority application within the sub-area.

In an aspect, AR applications 30 can render virtual objects and/or other synthetic elements, which can in turn be registered and/or anchored to a physical location. By way of example, an AR game that involves capturing virtual monsters can anchor and/or otherwise register virtual monsters to physical locations such as fountains in a park or the like. These virtual elements can be registered via the point cloud associated with the network management device 10 such that the network, via the network management device 10, can properly render the virtual elements and/or provide other aspects of the desired experience associated with the AR application 30.

In some embodiments, the point cloud for an area can be a central point cloud that is maintained by the network management device 10 and/or one or more other network elements and updated based on information and/or requests provided by respective AR applications 30 in the area. Also or alternatively, respective AR applications 30 can maintain their own local point clouds based on point cloud information received from the network management device 10. Other implementations are also possible.

In an aspect, situations can arise where respective AR applications 30 operating in an area can interfere with each other. For instance, multiple popular AR applications 30 operating in the same area can cause network congestion and/or other adverse impacts on communication performance in the area. By way of non-limiting example, if two or more AR applications 30 have virtual objects or other synthetic elements anchored to the same physical location, this can result in a large amount of network resource usage in the area that can in some cases be higher than the supported communication capacity of the area. Furthermore, it is highly desirable to enable AR applications associated with utilities or public safety, such as an application designed by a power utility for locating underground power lines and/or other objects, to operate with minimal interference from other applications in order to improve safety and accuracy. For these and/or other reasons, the network management device 10 can facilitate an allocation of network resources, such as edge network resources, between AR applications 30 operating in an area in a manner that improves the satisfaction and safety of users of said AR applications 30 in the area.

Figure 4:
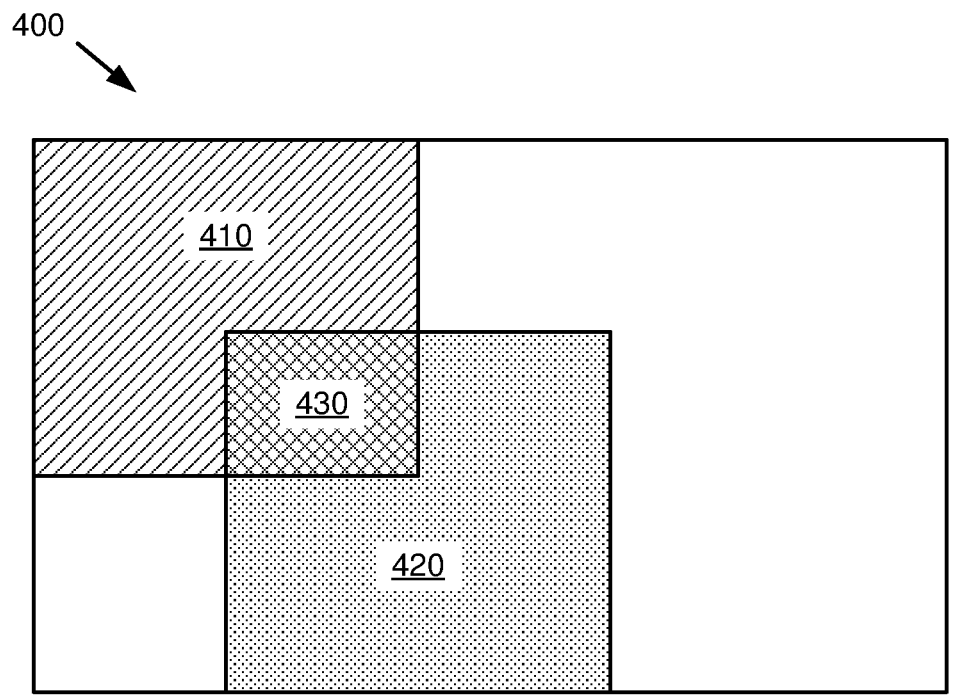
FIGS. 4-5 depict example operating areas for augmented reality applications that can be provisioned by the system of FIG. 3 in accordance with various aspects described herein.
Figure 5:
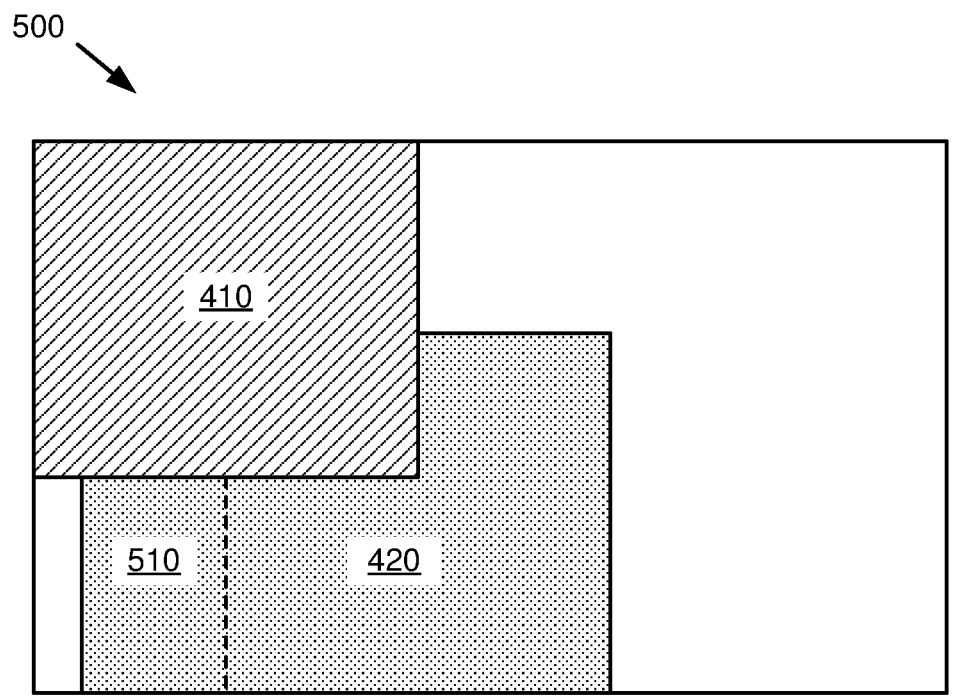

In another aspect, the network management device 10 can (e.g., via the resource control component 220 and/or the point cloud delineation component 320) grant one or more AR applications 30 exclusive access to edge network resources in a given area. For instance, as shown by diagram 400 in FIG. 4, two AR applications 30 can operate in respective sections of an area, respectively denoted as 410 and 420 in diagram 400. As further shown in diagram 400, sections 410 and 420 overlap at a section 430. Subsequently, the AR application 30 corresponding to section 410 can be given exclusive access to network resources in section 410, which includes the overlap section 430, as shown by diagram 500 in FIG. 5. In an aspect, the AR application 30 corresponding to section 420 can be informed by the network management device 10 of the boundaries of section 410, e.g., as mapped by the point cloud maintained by the network management device 10. In response to this notification, the AR application 30 corresponding to section 420 can adjust service in any suitable manner. For instance, the application can pause or suspend service in the overlap section 430, shift operations from overlap section 430 to a new area, such as section 510 shown in diagram 500, and/or perform other suitable operations.

In an aspect, when the network management device 10 grants exclusive network access to an application in a given area, the network management device 10 can further provide other applications in the area with an explanation for that access. Those applications can, in turn, perform operations with respect to the area based on the explanation, pass the explanation on to their users, etc. By way of example, if a public utility application is granted exclusive network access to an area, other applications can relocate from the area as appropriate and/or provide an explanation to their users of the reasons for relocating until the associated utility work has completed.

In addition to granting exclusive access to network resources in a given sub-area, the network management device 10 can allocate network resources among multiple AR applications 30 in an area in other suitable manners. For instance, a designated priority application can be given increased network bandwidth, image resolution, and/or other resources relative to non-priority applications in the area. In one example, restrictions placed in this manner can be based on the ability of an AR application 30 to dynamically relocate (e.g., as reported by the AR application 30 itself and/or based on usage statistics associated with the AR application 30). Restrictions can also be placed based on relative resource usage. For instance, an AR application 30 utilizing a disproportionate amount of network resources in an area relative to other applications can be throttled and/or otherwise adjusted to facilitate improved access to network resources by other applications in the area. Other factors could also be considered.

Figure 6:
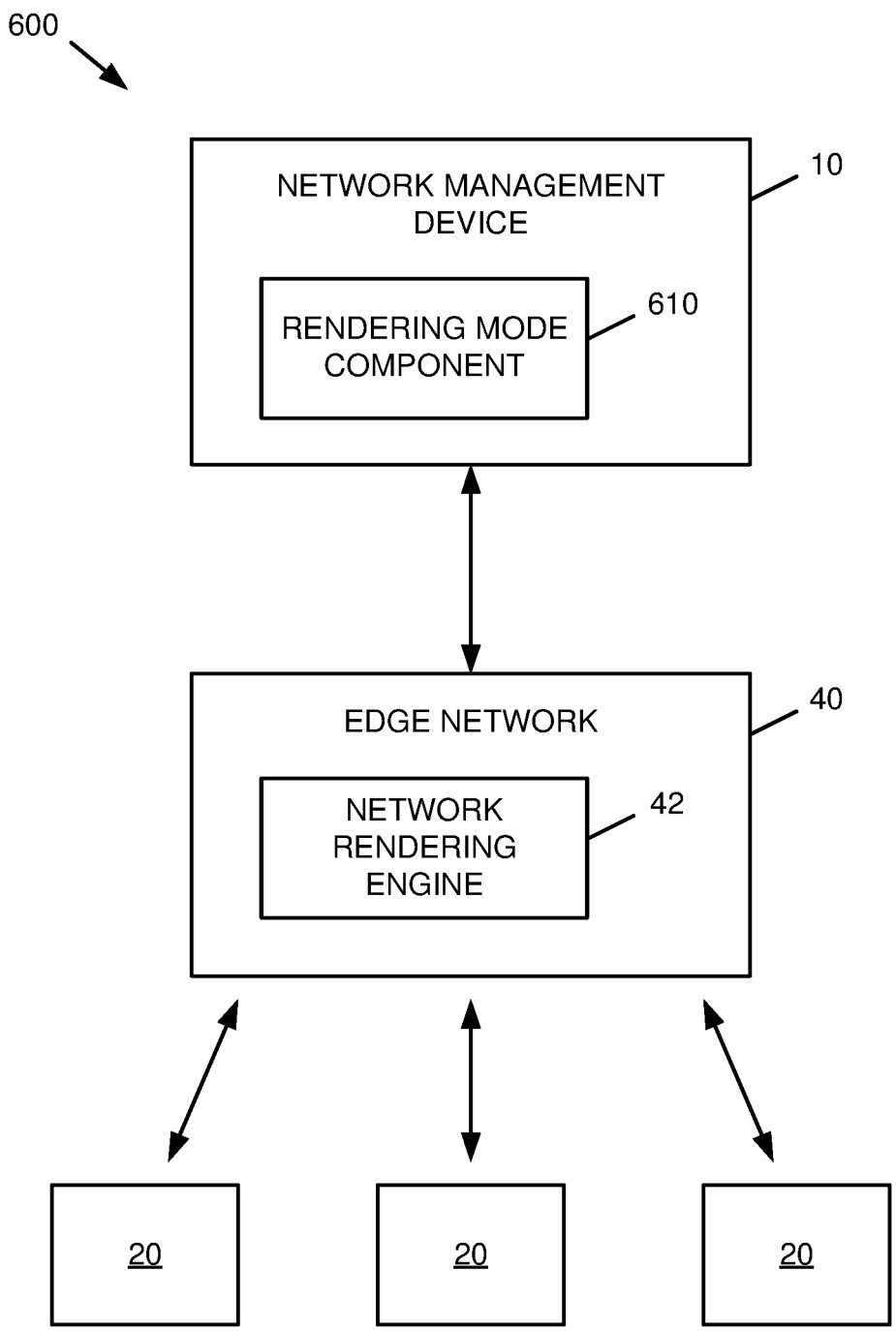
FIG. 6 is a block diagram of a system that facilitates direction of object rendering for an augmented reality application in accordance with various aspects described herein.

With reference next to FIG. 6, a block diagram of a system 600 that facilitates direction of object rendering for an augmented reality application in accordance with various aspects described herein is illustrated. Repetitive description of like elements employed in other embodiments described herein is omitted for sake of brevity. System 600 as shown in FIG. 6 includes a network management device 10 that can operate together with one or more elements of an edge network 40 as described above to provide an AR/MR experience to one or more UEs 20 connected to the edge network 40.

In an aspect, an AR application 30 and/or an associated VVE can utilize multiple techniques for rendering and/or registering synthetic elements. For example, a VVE can support a local rendering mode in which virtual objects and/or other synthetic elements are rendered locally at participating UEs 20 as well as a broadcast rendering mode in which at least some virtual objects or synthetic elements are rendered at the edge network 40, e.g., via a network rendering engine 42, and broadcast to the participating UEs 20. In other words, in the broadcast rendering mode, a single instance of a virtual element can be rendered by the edge network 40 and subsequently shared and interacted with independently by respective UEs 20 in the area.

The network management device 10 as shown in system 600 includes a rendering mode component 610, which can acquire information relating to the edge network 40 and/or associated UEs 20 and select an appropriate rendering mode for a VVE provided by the edge network 40 based on that information. For instance, the rendering mode component 610 can acquire information relating to an amount of UEs 20 or other devices interacting with AR applications operating in an area and utilize this information to select a rendering mode for at least one of the AR applications, e.g., by switching a selected AR application from a local rendering mode to a broadcast rendering mode in response to the amount of devices interacting with the selected application being greater than a threshold. Stated another way, the rendering mode component 610 can shift a rendering architecture associated with a given VVE when the number of UEs 20 or other devices interacting with a given VVE makes it more efficient to do so.

In an aspect, the threshold number of users associated with shifting between different rendering modes can be a static threshold or a dynamic threshold, e.g., based on current network capacity or loading, computing power associated with respective user devices in the area, and/or other suitable factors. In general, one or more criteria utilized by the rendering mode component 610 can be dynamically set and/or adjusted to account for changing bottlenecks and/or other resource restrictions associated with the communication system in order to make efficient use of the available resources.

Figure 7:
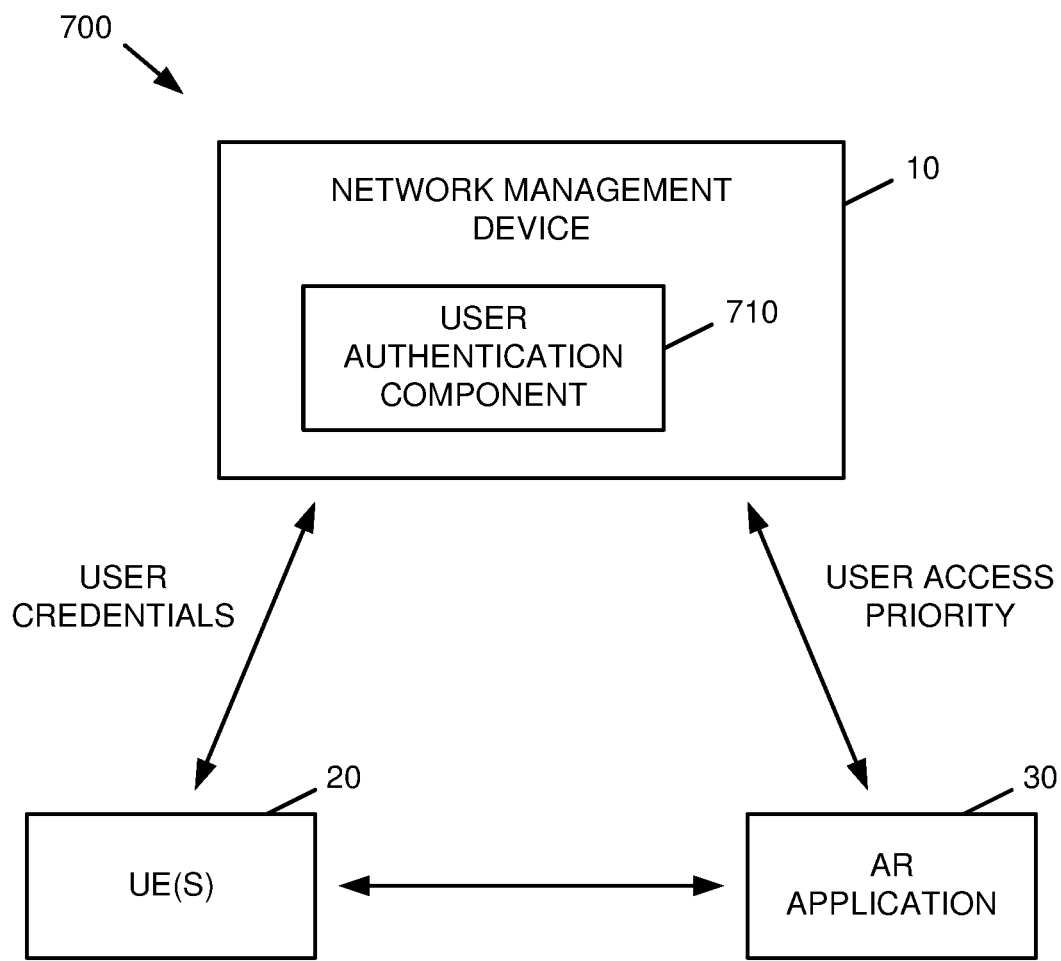
FIG. 7 is a block diagram of a system that facilitates managing access to an augmented reality application based on user credentials in accordance with various aspects described herein.

Turning to FIG. 7, a block diagram of a system 700 that facilitates managing access to an augmented reality application based on user credentials in accordance with various aspects described herein is illustrated. Repetitive description of like elements employed in other embodiments described herein is omitted for sake of brevity. As shown by FIG. 7, system 700 includes a network management device 10 with a user authentication component 710, which can acquire credential information associated with a user of an AR application 30, e.g., from a UE 20 associated with that user, and assign an access priority to the AR application 30 based on the credential information.

In an aspect, the user authentication component 710 can be utilized by the network management device 10 as part of a set of functions that enable the network management device 10 to gather information about a particular environment and/or actors in that environment and to use that information to alter network and/or server configurations as desired to improve an experience for one or more users of an AR application 30.

In another aspect, whether and/or to what extent a particular user is granted access and/or prioritized access to a given AR application 30 can be determined by the user authentication component 710 according to one or more rules. For instance, an AR application 30 could be age-restricted such that the user authentication component 710 grants access to the AR application only to users who are at least a certain age (e.g., 18 years of age, 21 years of age, etc.). As another example, the user authentication component 710 can grant access to an AR application 30 designed for public utility maintenance or other restricted-access activities only upon verifying a user's authorization to perform those activities.

In other embodiments, the user authentication component 710 can make inferences about a particular user with respect to an AR application 30 and selectively grant the user access to the AR application 30 based on those inferences. For example, the user authentication component 710 could infer, based on UE trajectory and/or movement information, that a user has a high degree of interest in the AR application 30 based on, e.g., that user's interactions with the AR application 30, the user remaining in an area associated with the AR application 30, etc. Based on these inferences, the user authentication component 710 can grant that user increased network resources relative to another user that, e.g., is merely passing through the area.

As a further example, the user authentication component 710 can assign access priority to a given UE 20 based on subscription information or other policies. For instance, if an AR application 30 offers a free service tier and a paid service tier, a UE 20 associated with the paid service tier can be granted additional resources relative to a UE 20 associated with the free service tier.

In an additional aspect, the user authentication component 710 can consolidate different types of information to create profiles that can in turn be utilized to perform access priority designations. For instance, a profile could include information relating to a particular UE 20, a user associated with the UE 20, an AR application 30 running on the UE 20, an area in which the UE 20 is located, etc.

Figure 8:
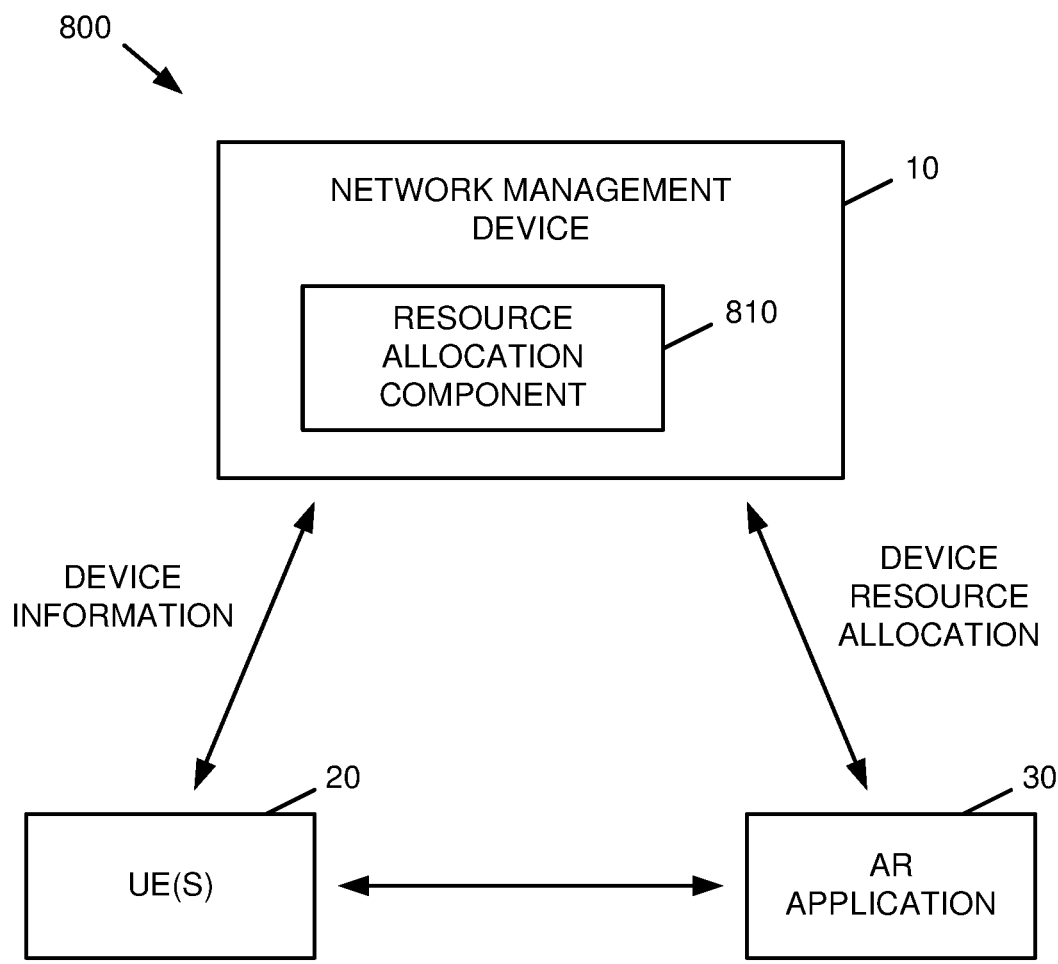
FIG. 8 is a block diagram of a system that facilitates allocating network resources for an augmented reality application based on device specifications in accordance with various aspects described herein.

With reference next to FIG. 8, a block diagram of a system 800 that facilitates allocating network resources for an augmented reality application based on device specifications in accordance with various aspects described herein is illustrated. Repetitive description of like elements employed in other embodiments described herein is omitted for sake of brevity. System 800 as shown in FIG. 8 includes a network management device 10 with a resource allocation component 810 that acquires information relating to computing resources of UEs 20 and/or other devices interacting with an AR application 30 and allocates edge network resources and/or other resources to those devices according to their computing resources.

In an aspect, a resource allocation for a particular UE 20 can be assigned by the resource allocation component 810 based on the capabilities of that UE 20. For instance, the resource allocation component can assign parameters such as data transfer rate, image resolution, frame rate, or the like based on the radio and/or display capabilities of the UE 20. In another aspect, the resource allocation component 810 can assign resources to respective UEs 20 based on available edge network resources. By way of example, the resource allocation component 810 can analyze the availability of renderers, compression technology, wireless spectrum, and/or other resources associated with the edge network and adjust various aspects of a VVE associated with an AR application, such as metadata transmission model, object registration accuracy and/or timeliness, data update frequency, interactivity level, etc., based on that analysis. Other considerations can also be used.

Figure 9:
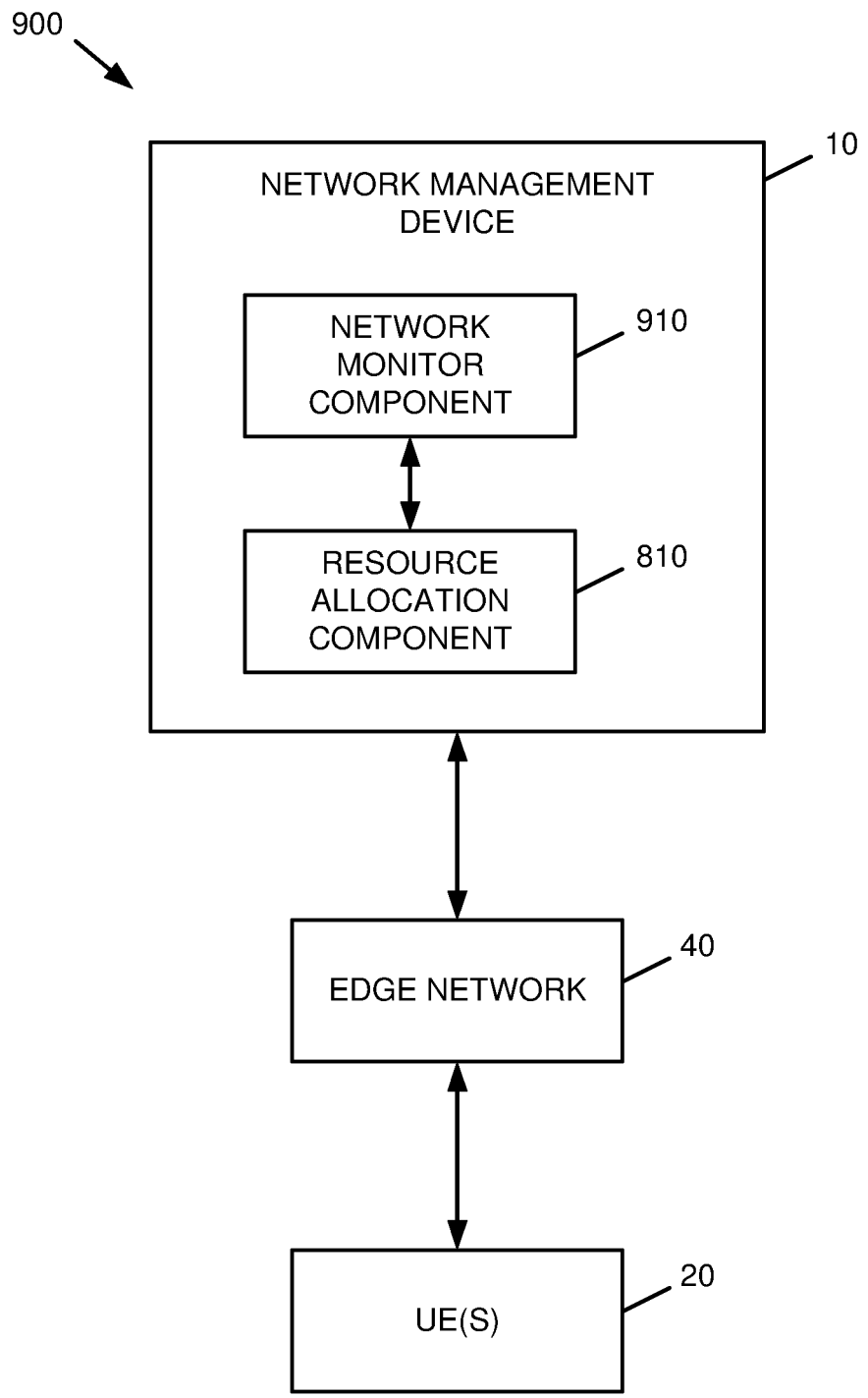
FIG. 9 is a block diagram of another system that facilitates allocating network resources for an augmented reality application in accordance with various aspects described herein.

In another aspect, the resources allocated to a given device and/or application can be determined by the resource allocation component 810 based on the resources currently available in the network. For instance, as shown by system 900 in FIG. 9, the network management device 10 can further include a network monitor component 910 that monitors availability of resources associated with an edge network 40 in a given area such that the resource allocation component 810 can allocate resources based on their availability. In this manner, the network management device 10 can be made adaptable to changes in user load, available wireless spectrum, and/or other factors that could potentially impact performance of respective applications in a given area.

Figure 10:
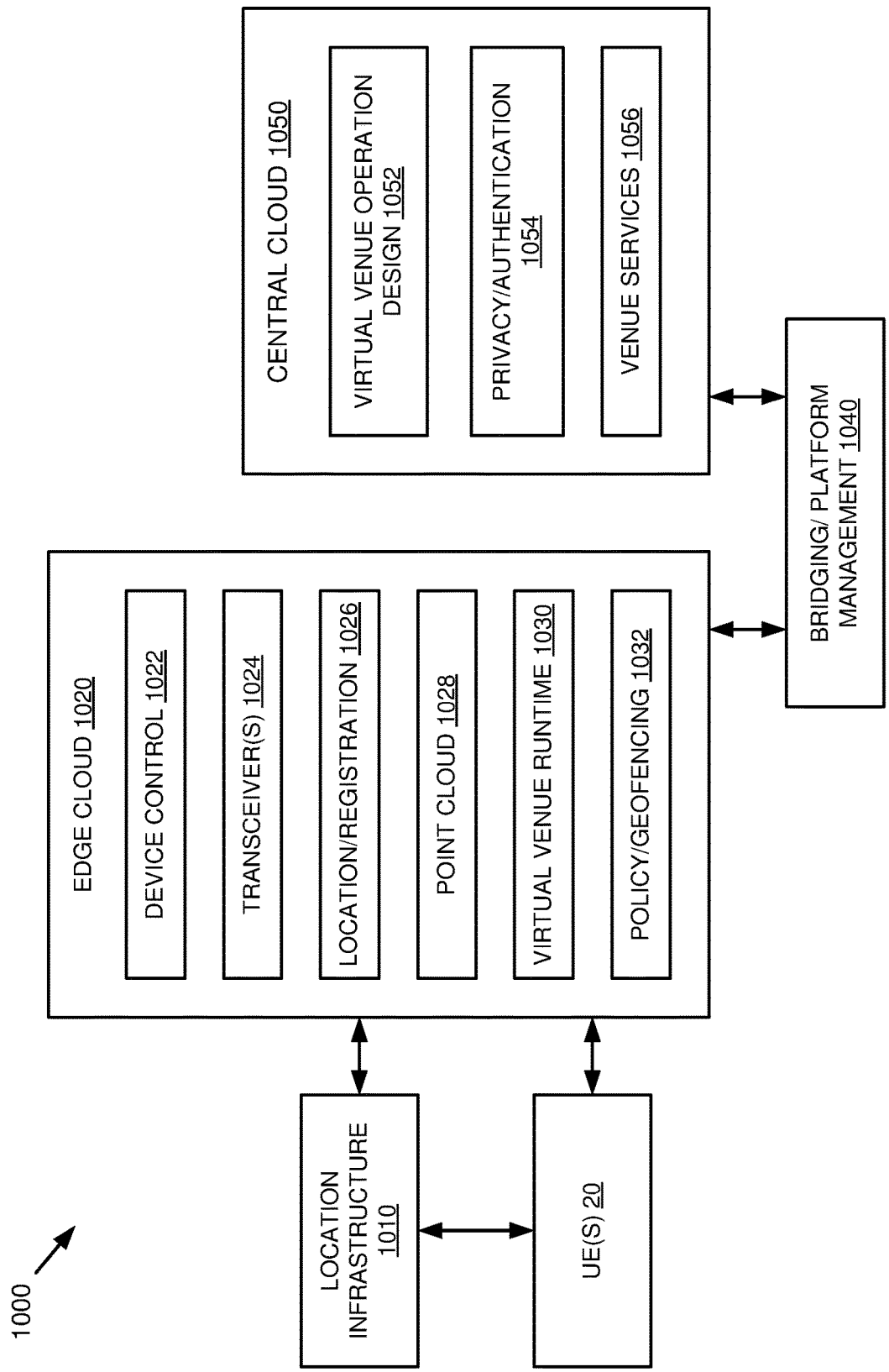
FIG. 10 is a diagram of an example network architecture in which various embodiments described herein can function.

Turning now to FIG. 10, a diagram 1000 of an example network architecture in which various embodiments described herein can function is illustrated. It should be appreciated that the network architecture shown by diagram 1000 is merely one example of a network architecture that could be employed and that other network architectures are possible. It should further be appreciated that respective functional blocks discussed with respect to diagram 1000 could be implemented by any suitable number of devices.

As shown by diagram 1000, a network architecture for AR/MR/VR applications can be interacted with via one or more UEs 20. A UE 20 as described herein can be any suitable device that facilitates interaction with one or more applications. For instance, a UE 20 can include, but may not be limited to, a smartphone, a virtual reality headset, a laptop or desktop computer, etc.

As additionally shown by diagram 1000, respective UEs 20 can interact with a location infrastructure 1010 to provide information to the network regarding positioning of said UEs 20. This location infrastructure 1010 can include, e.g., network transmitters that provide triangulation functionality, cameras, wireless beacons or tags, and/or any other suitable devices.

The UEs 20 and location infrastructure 1010 as shown by diagram 1000 can further interact with an edge cloud (edge network) 1020, which provides low-latency functionality for one or more applications as generally described above. The edge cloud 1020 can include a device control block 1022 that can adapt a given application to available network and/or device resources (e.g., as described above with respect to the resource allocation component 810), determine a division of processing between the edge cloud platform and individual devices (e.g., as described above with respect to the rendering mode component 610 in the example of object rendering), and/or perform other appropriate actions.

The edge cloud 1020 further includes one or more transceivers 1024, which can include Evolved Node Bs (eNBs), remote radio heads (RRHs), baseband units (BBUs), WiFi access points, and/or other devices that provide communication functionality between the edge cloud 1020 and the UEs 20.

The edge cloud 1020 shown in diagram 1000 can further include a location/registration block 1026, which can determine the positions of respective UEs 20, e.g., with the aid of a point cloud 1028. This positioning can in turn be utilized to facilitate orientation and/or visual registration of respective synthetic elements associated with a given AR application.

Based on device information associated with the device control block 1022, location data associated with the location/registration block 1026 and/or the point cloud 1028, and/or other suitable information, a VVE associated with a given AR/MR/VR application can be generated via a virtual venue runtime 1030. In an aspect, the virtual venue runtime 1030 can operate to provide an at least partially virtualized experience based on information provided via the edge cloud 1020 in addition to a set of policies 1032 such as geofencing or the like.

As further shown in diagram 1000, the edge cloud 1020 can interact with a central cloud 1050 via a bridging/platform management system 1040. While the edge cloud 1020 can generally be located near the location of a given application to facilitate low-latency operation as described above, the central cloud 1050 can be a centralized network system that performs one or more high level operations with respect to an application that are not as time-sensitive as operations associated with the edge cloud 1020. In an aspect, the bridging/platform management system 1040 can facilitate communication between the edge cloud 1020 and the central cloud 1050 via the Internet and/or one or more other suitable communication or computing networks.

The central cloud 1050 shown in diagram 1000 includes a virtual venue operation design block 1052, which can be utilized to onboard one or more software platforms used to create a given application (e.g., Unity, Java, etc.) and facilitate interaction between those software platforms and the network environment shown by diagram 1000. The virtual venue operation design block 1052 can further control various aspects of how a given application performs, such as an application's area of operation, monetization, user eligibility, or the like.

The central cloud 1050 further includes a privacy/authentication block 1054 that can facilitate secure management of user data, e.g., in connection with user authorization as performed by the virtual venue operation design block 1052. To these ends, the central cloud 1050 can additionally include a venue services block 1056 which can handle operations such as user registration, payment collection, and/or other suitable operations.

Figure 11:
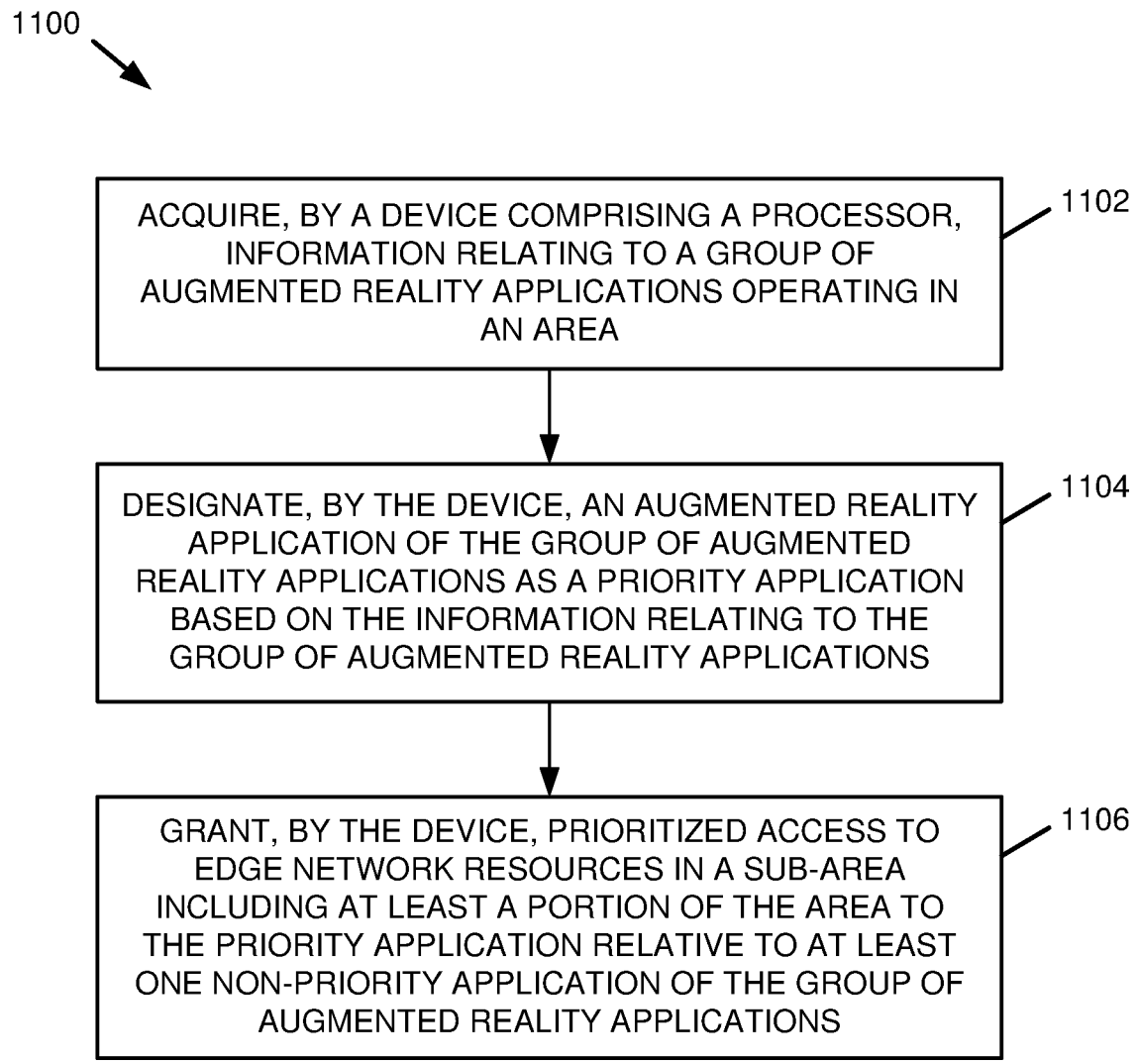
FIG. 11 is a flow diagram of a method for augmented/mixed reality virtual venue pipeline optimization in accordance with various aspects described herein.

FIG. 11 illustrates a method in accordance with certain aspects of this disclosure. While, for purposes of simplicity of explanation, the method is shown and described as a series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

With reference to FIG. 11, a flow diagram of a method 1100 for augmented/mixed reality virtual venue pipeline optimization is presented. At 1102, a device comprising a processor (e.g., a network management device 10 comprising a processor 14) can acquire information relating to a group of AR applications (e.g., AR applications 30) operating in an area.

At 1104, the device can designate (e.g., by a priority designation component 210 and/or other components implemented by the processor 14) an AR application of the group of AR applications for which information was acquired at 1102 as a priority application based on the information acquired at 1102.

At 1106, the device can grant (e.g., by a resource control component 220 and/or other components implemented by the processor 14) prioritized access to edge network resources in a sub-area that includes at least a portion of the area in which the AR applications operate to the priority application designated at 1104 relative to at least one non-priority application of the group of AR applications for which information was acquired at 1102.

Figure 12:
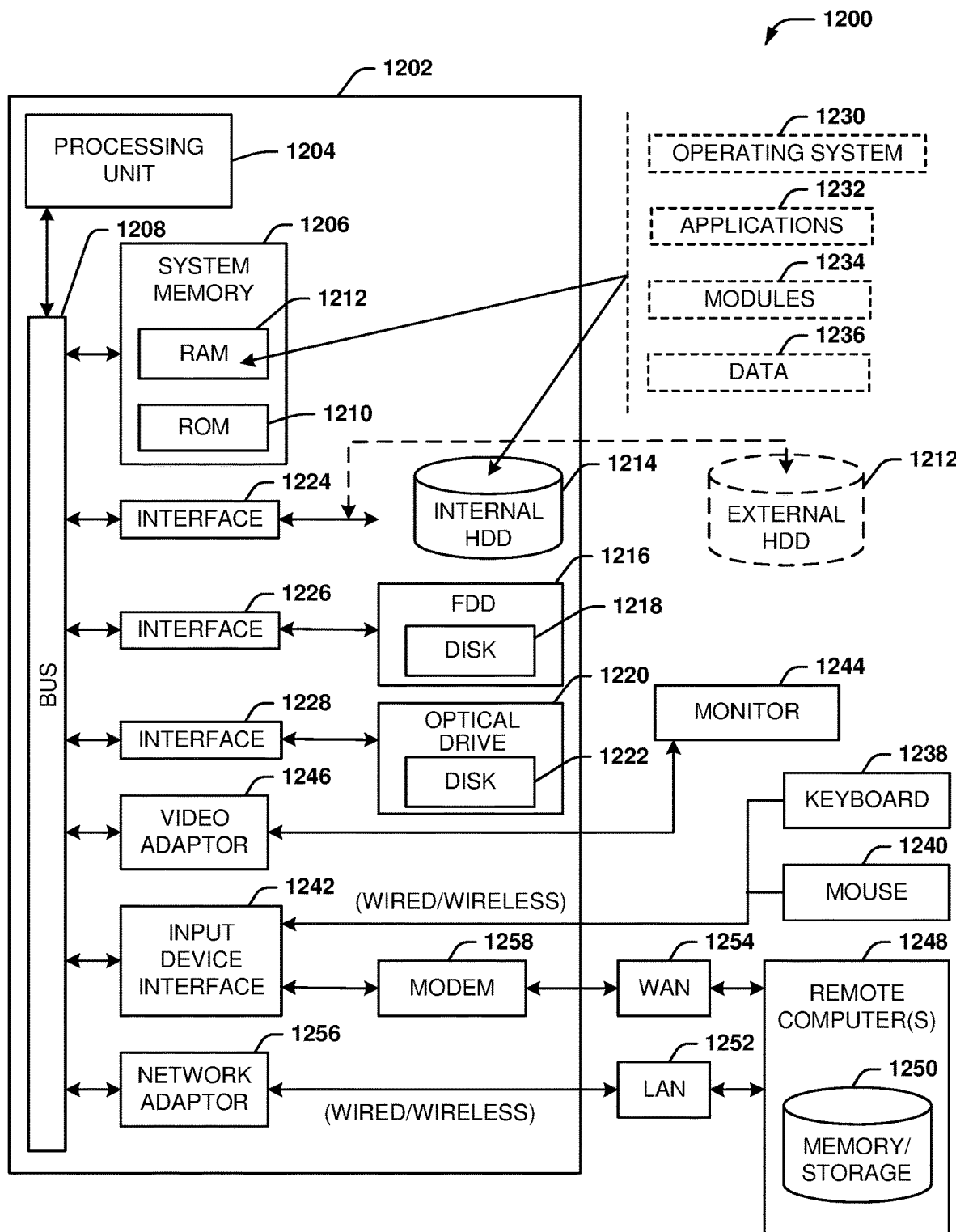
FIG. 12 depicts an example computing environment in which various embodiments described herein can function.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). While the internal HDD 1214 is illustrated as located within the computer 1202, the internal HDD 1214 can also be configured for external use in a suitable chassis (not shown). The HDD 1214, magnetic FDD 1216 and optical disk drive 1220 can be connected to the system bus 1208 by an HDD interface 1224, a magnetic disk drive interface 1226 and an optical drive interface 1228, respectively. The interface 1224 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to an HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) can include a microphone, an infrared (IR) remote control, a joystick, a game pad, a stylus pen, touch screen or the like. These and other input devices are often connected to the processing unit 1204 through an input device interface 1242 that can be coupled to the system bus 1208, but can be connected by other interfaces, such as a parallel port, an IEEE 1394 serial port, a game port, a USB port, an IR interface, etc.

A monitor 1244 or other type of display device can be also connected to the system bus 1208 via an interface, such as a video adapter 1246. In addition to the monitor 1244, a computer typically includes other peripheral output devices (not shown), such as speakers, printers, etc.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1252 through a wired and/or wireless communication network interface or adapter 1256. The adapter 1256 can facilitate wired or wireless communication to the LAN 1252, which can also include a wireless access point (AP) disposed thereon for communicating with the wireless adapter 1256.

When used in a WAN networking environment, the computer 1202 can include a modem 1258 or can be connected to a communications server on the WAN 1254 or has other means for establishing communications over the WAN 1254, such as by way of the Internet. The modem 1258, which can be internal or external and a wired or wireless device, can be connected to the system bus 1208 via the input device interface 1242. In a networked environment, program modules depicted relative to the computer 1202 or portions thereof, can be stored in the remote memory/storage device 1250. It will be appreciated that the network connections shown are example and other means of establishing a communications link between the computers can be used.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    acquiring, by a device comprising a processor, information relating to a group of augmented reality applications operating in an area, the group of augmented reality applications utilizing common edge network resources that are shared by respective applications of the group of augmented reality applications;
    designating, by the device, an augmented reality application of the group of augmented reality applications as a priority application in a sub-area comprising at least a portion of the area based on the information relating to the group of augmented reality applications; and
    granting, by the device, a first amount of the common edge network resources in the sub-area to the priority application, wherein the first amount of the common edge network resources is greater than a second amount of the common edge network resources granted to at least one non-priority application of the group of augmented reality applications within the sub-area.

2. The method of claim 1, further comprising:
    mapping, by the device, the area via a point cloud; and
    delineating, by the device, the sub-area in the point cloud, wherein the granting comprises granting the first amount of the common edge network resources to the priority application within the sub-area based on the point cloud.

3. The method of claim 2, wherein the granting comprises granting the priority application exclusive access to the common edge network resources within the sub-area, and wherein the method further comprises:
    notifying, by the device, the at least one non-priority application of respective boundaries of the sub-area as mapped by the point cloud.

4. The method of claim 2, further comprising:
    notifying, by the device, the at least one non-priority application of a resource restriction associated with the sub-area as a result of the granting.

5. The method of claim 1, wherein the acquiring comprises acquiring information relating to an amount of devices interacting with the group of augmented reality applications operating in the area.

6. The method of claim 5, further comprising:
    switching, by the device, a selected augmented reality application of the group of augmented reality applications from a local rendering mode to a broadcast rendering mode in response to the amount of devices interacting with the selected augmented reality application being greater than a threshold.

7. The method of claim 1, wherein the acquiring comprises acquiring credential information associated with a user of the group of augmented reality applications operating in the area, and wherein the method further comprises:
    granting, by the device, the user prioritized access to at least one augmented reality application of the group of augmented reality applications operating in the area based on the credential information.

8. The method of claim 1, wherein the granting comprises increasing a registration accuracy for virtual objects associated with the priority application in the area.

9. The method of claim 1, further comprising:
    monitoring availability of the common edge network resources in the area, wherein the granting comprises determining the first amount of the common edge network resources and the second amount of the common edge network resources according to the availability of the common edge network resources in the area.

10. A system, comprising:
a processor; and
a memory that stores executable instructions that, when executed by the processor, facilitate performance of operations, the operations comprising:
acquiring information relating to a group of augmented reality applications operating in an area and utilizing common edge network resources associated with the area;
designating an augmented reality application of the group of augmented reality applications as a priority application in a sub-area comprising at least a portion of the area based on the information relating to the group of augmented reality applications; and
prioritizing availability of the common edge network resources for the priority application over that of at least one non-priority application of the group of augmented reality applications within the sub-area.

11. The system of claim 10, wherein the operations further comprise:
mapping the area using a point cloud; and
allocating the sub-area in the point cloud for the priority application;
wherein the prioritizing comprises prioritizing the availability of the common edge network resources for the priority application within the sub-area based on the point cloud.

12. The system of claim 11, wherein:
the prioritizing comprises granting the priority application exclusive access to the common edge network resources within the sub-area; and
the operations further comprise notifying the at least one non-priority application of respective boundaries of the sub-area as mapped by the point cloud.

13. The system of claim 10, wherein the operations further comprise:
acquiring information relating to an amount of devices interacting with the group of augmented reality applications operating in the area.

14. The system of claim 13, wherein the operations further comprise:
switching a selected augmented reality application of the group of augmented reality applications from a local rendering mode to a broadcast rendering mode in response to the amount of devices interacting with the selected augmented reality application being greater than a threshold.

15. The system of claim 10, wherein the operations further comprise:
receiving credentials associated with a user of the group of augmented reality applications operating in the area; and
granting the user prioritized access to at least one augmented reality application of the group of augmented reality applications operating in the area based on the credentials.

16. A non-transitory machine-readable medium, comprising executable instructions that, when executed by a processor, facilitate performance of operations, comprising:
obtaining information relating to a group of augmented reality applications operating within a geographical area and utilizing common edge cloud resources associated with the geographical area;
selecting an augmented reality application of the group of augmented reality applications based on the information relating to the group of augmented reality applications, resulting in a selected augmented reality application; and
granting a first amount of the common edge cloud resources to the selected augmented reality application within a section of the geographical area, wherein the first amount of the common edge cloud resources is greater than a second amount of the common edge cloud resources granted to at least one non-selected augmented reality application of the group of augmented reality applications within the section of the geographical area.

17. The non-transitory machine-readable medium of claim 16, wherein the operations further comprise:
generating a point cloud for the geographical area;
allocating the section of the geographical area in the point cloud for the selected augmented reality application; and
granting the first amount of the common edge cloud resources to the selected augmented reality application within the section of the geographical area based on the point cloud.

18. The non-transitory machine-readable medium of claim 17, wherein the operations further comprise:
granting the selected augmented reality application exclusive access to the common edge cloud resources within the section of the geographical area; and
notifying the at least one non-selected augmented reality application of respective boundaries of the section of the geographical area according to the point cloud.

19. The non-transitory machine-readable medium of claim 16, wherein the operations further comprise:
acquiring credentials for a user interacting with an augmented reality application of the group of augmented reality applications; and
granting the user prioritized access to the common edge cloud resources for the augmented reality application of the group of augmented reality applications based on the credentials.

20. The method of claim 1, wherein the common edge network resources comprise at least one resource selected from a group comprising edge network bandwidth and edge network computing resources.

* * * * *